UNITED STATES PATENT OFFICE.

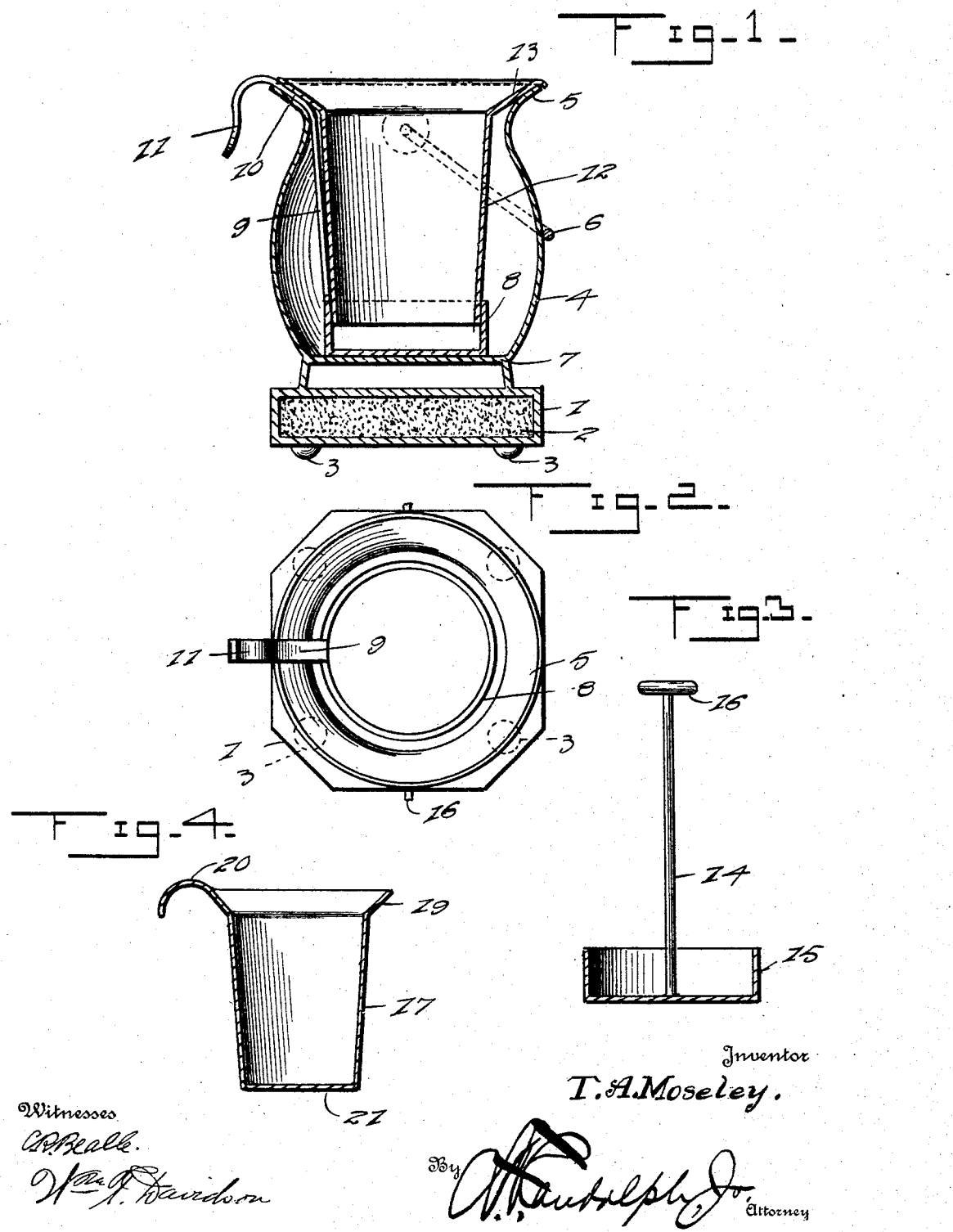

THOMAS A. MOSELEY, OF KANSAS CITY, KANSAS.

SANITARY CUSPIDOR.

1,186,424. Specification of Letters Patent. Patented June 6, 1916.

Application filed March 3, 1916. Serial No. 81,904.

*To all whom it may concern:*

Be it known that I, THOMAS A. MOSELEY, a citizen of the United States, residing at Kansas City, in the county of Wyandotte and State of Kansas, have invented certain new and useful Improvements in Sanitary Cuspidors; and I do hereby declare the following to be a full, clear, and exact description of the invention, such as will enable others skilled in the art to which it appertains to make and use the same.

This invention relates to new and useful improvements in a sanitary cuspidor and one of its objects is to provide a device of this character, which shall be simple, durable and efficient, and which may be manufactured and sold at a comparatively low cost.

Another object of this invention is to provide a bowl resting upon a base to receive a substantially funnel-shaped member to receive all matter dispensed into the bowl and which may be readily removed when desired for emptying and cleaning of the device.

A further object of this invention is to provide a receptacle containing disinfecting material, adapted to rest within the bowl and receive the lower end of the funnel-shaped member and has secured thereto a suitable handle, whereby the receptacle and funnel-shaped member may be removed from the bowl simultaneously for emptying and cleaning.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which,—

Figure 1 is a vertical sectional view of a sanitary cuspidor, constructed in accordance with my invention, Fig. 2 is a top plan view of the same, illustrating the funnel-shaped member removed, Fig. 3 is a vertical sectional view of the receptacle removed from the bowl, illustrating the modified form of handle, and Fig. 4 is a vertical sectional view, illustrating a modified form of funnel-shaped member.

Referring in detail to the drawing, the numeral 1 designates a hollow base filled with sand or other suitable material 2 for weighting the base and having secured thereto a plurality of feet 3. The base 1 may be of any desired shape, but preferably octagon formation, to efficiently support a bowl 4, having a flared opened end 5. A suitable handle 6 is secured to each side of the bowl 4 for conveying the device from one place to another.

The bowl 4 has a suitable false bottom 7 in the lower end thereof to support a disinfecting receptacle 8, which may be partly filled with any well known disinfectant. Secured to the upper edge of the receptacle 8 is a vertically extending handle 9, which is bent as illustrated at 10 to lie upon the flared opened end 5 of the bowl 4. The free end thereof is bent outwardly and downwardly to provide a handle grip 11, which is spaced away from the sides of the bowl 4, whereby a person may readily grip the hand grip 11 and withdraw the receptacle 8 from the bowl 4 when desired.

A substantially funnel-shaped member 12, having an outwardly flared upper end 13, is adapted to rest upon and overlie the flared opened end 5 of the bowl 4. The lower end of the funnel-shaped member 12 is open and is received within the receptacle 8, the walls of which frictionally engage the walls of the receptacle 8. When the receptacle 8 is removed from the bowl 4 by pulling upwardly upon the handle 9, it will carry with it the funnel-shaped member 12, which will rest upon the bent portion 10 of the handle 9 and will efficiently support the upper end of the funnel-shaped member 12, eliminating the danger of the funnel-shaped member from accidentally falling from an engagement with the receptacle 8 when being carried from the bowl 4 to a suitable place for emptying and cleaning.

Referring to my modified form of handle in Fig. 3, it consists of a vertical extending rod 14, secured centrally of the disinfecting receptacle 15, and has secured to the upper end thereof, a substantially flat head or disk 16, to provide a hand grip. When the receptacle 15 is placed within the bowl 4, the rod 14 will extend upwardly and centrally through the funnel-shaped member 12 and terminate above the flared opened end 13, whereby the hand grip 16 may be readily grasped by a person to remove the receptacle 15 and funnel-shaped member 12 from the bowl 4.

Referring to my modified form of funnel-shaped member, as illustrated in Fig. 4, it consists of downwardly inclined walls 17 and an outwardly flared opened end 19, having a suitable handle 20 secured thereto. The lower end being closed by a bottom wall 21, which provides a receptacle when placed within the bowl 4, the disinfecting receptacles 8 or 15 may be eliminated. If desired the funnel-shaped member 12 or the modified form may be eliminated from the bowl 4 and simply place the receptacle 8 or 15 therein to receive all substances which may be dispensed within the bowl 4.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A sanitary cuspidor comprising a base, feet formed on said base, a bowl secured to said base, said bowl provided with its upper end flared outwardly and upwardly, a false bottom formed within the lower end of said bowl, a disinfecting receptacle within the bowl and resting upon the false bottom, a substantially funnel-shaped member provided with its upper end flared outwardly and upwardly and resting upon the upwardly and outwardly flared end of the bowl, a vertically extending handle formed on the receptacle and bent to lie upon the upwardly and outwardly flared end of the bowl, said handle provided with its free end bent downwardly to form a hand grip whereby the receptacle and funnel-shaped member may be removed simultaneously from the bowl, and a handle secured to the bowl.

2. A sanitary cuspidor comprising a base, a bowl secured to the base, a false bottom formed in the bowl, a shallow disinfecting receptacle positioned on the false bottom within the bowl, a substantially funnel-shaped member resting upon the upper end of the bowl and its lower extremity extending into the shallow disinfecting receptacle, and means connected to the shallow disinfecting receptacle for removing the funnel-shaped member and receptacle simultaneously.

In testimony whereof I affix my signature in presence of two witnesses.

THOMAS A. MOSELEY.

Witnesses:
C. A. LOWDER,
JOHN MAHONEY.

Copies of this patent may be obtained for five cents each, by addressing the "Commissioner of Patents, Washington, D. C."